United States Patent
Ienaga et al.

(10) Patent No.: US 10,299,352 B2
(45) Date of Patent: *May 21, 2019

(54) LIGHT SOURCE CONTROL SYSTEM

(71) Applicant: Renesas Electronics Corporation, Tokyo (JP)

(72) Inventors: Takashi Ienaga, Tokyo (JP); Satoshi Kaneko, Tokyo (JP); Kazumi Ishii, Tokyo (JP); Akio Fujii, Tokyo (JP); Takahisa Gunji, Tokyo (JP)

(73) Assignee: Renesas Electronics Corporation, Tokyo ( * ) Notice: Subject to any disclaimer, the term of this patent is extended or adjusted under 35 U.S.C. 154(b) by 0 days.

This patent is subject to a terminal disclaimer.

(21) Appl. No.: 16/058,342

(22) Filed: Aug. 8, 2018

(65) Prior Publication Data

US 2018/0352634 A1    Dec. 6, 2018

Related U.S. Application Data

(63) Continuation of application No. 15/411,980, filed on Jan. 21, 2017, now Pat. No. 10,070,502.

(30) Foreign Application Priority Data

Mar. 10, 2016    (JP) .................................. 2016-046706

(51) Int. Cl.
*H05B 37/02*    (2006.01)
*H04L 12/413*    (2006.01)
*H04L 12/28*    (2006.01)

(52) U.S. Cl.
CPC ..... *H05B 37/0254* (2013.01); *H04L 12/2838* (2013.01); *H04L 12/413* (2013.01)

(58) Field of Classification Search
CPC ........................ H05B 37/0254; H04L 12/413
(Continued)

(56) References Cited

U.S. PATENT DOCUMENTS 5,627,828 A * 5/1997 Lee ................... H04L 12/40013
370/445
8,290,368 B2    10/2012 Williams
(Continued)

FOREIGN PATENT DOCUMENTS

JP    2013-004484 A    1/2013

*Primary Examiner* — Daniel D Chang
(74) *Attorney, Agent, or Firm* — Shapiro, Gabor and Rosenberger, PLLC

(57) ABSTRACT

A light source control system includes a plurality of light sources, and a plurality of light source control devices. The light source control devices include a plurality of main light source control devices that transmits command signals to the other light source control devices. Each main light source control device includes a collision determination circuit that determines whether data of the command signal transmitted through a bus has collided with other data, and a restoration circuit that executes a restoration operation in the case of a collision. The collision determination circuit includes an edge detection circuit that detects change timing of a signal representing the data of the command signal, an area setting circuit that sets a collision determination area in accordance with the detected change timing detected, and a collision detection circuit that detects the presence or absence of a collision in the set collision determination area.

8 Claims, 14 Drawing Sheets

(58) Field of Classification Search
USPC .......................................................... 315/312
See application file for complete search history.

(56) References Cited

U.S. PATENT DOCUMENTS

| | | |
|---|---|---|
| 9,241,389 B2 | 1/2016 | Piper |
| 9,596,737 B2 * | 3/2017 | Harbers ............. H05B 33/0845 |
| 2011/0069094 A1 | 3/2011 | Knapp |
| 2013/0119894 A1 | 5/2013 | Yeh et al. |

* cited by examiner

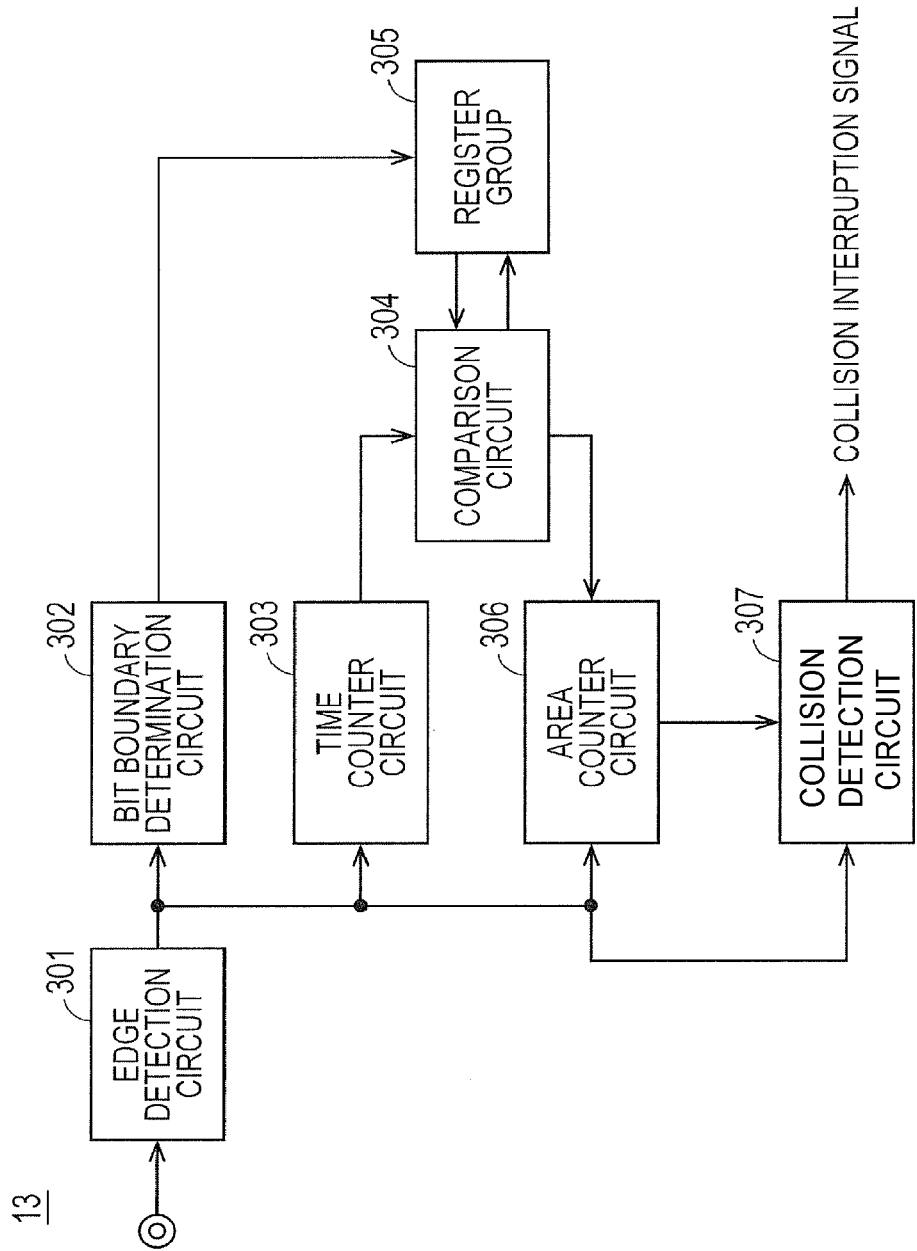

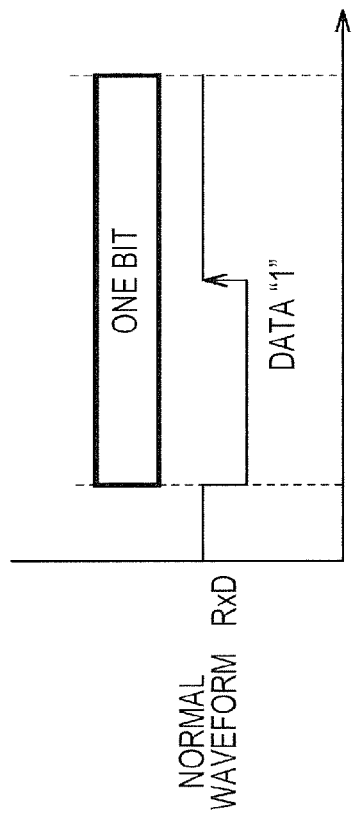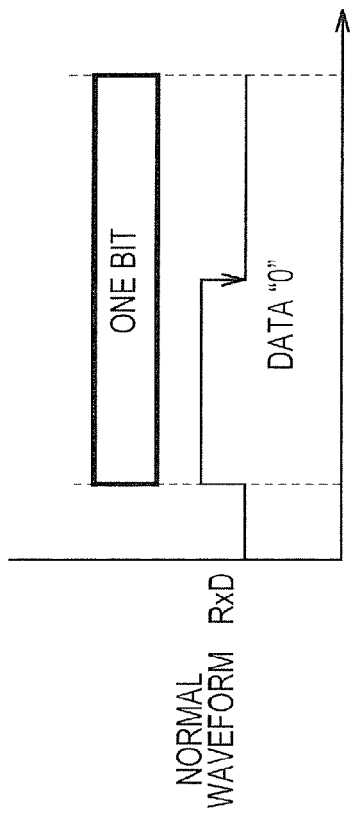

LIGHT SOURCE CONTROL SYSTEM

CROSS-REFERENCE TO RELATED APPLICATIONS

The disclosure of Japanese Patent Application No. 2016-046706 filed on Mar. 10, 2016 including the specification, drawings and abstract is incorporated herein by reference in its entirety.

The disclosure relates to a device that controls the light of an illumination device.

BACKGROUND

A light control method in which a PWM signal as a light control instruction signal is input to control the light of a light source in accordance with the on-duty of the signal, or a light control method in which a 0 to 10 V control signal as a light control instruction signal is input to control the light of a light source in accordance with the analog value of the signal has been known from the past.

On the other hand, as an illumination control system, a system (illumination control system) that controls an illumination device by transmitting a signal compliant with the DALI (Digital Addressable Lighting Interface) standard as a light control instruction signal has recently been developed mainly in Europe.

In this respect, Japanese Unexamined Patent Application Publication No. 2013-4484 proposes an illumination control system compliant with the DALI standard.

SUMMARY

On the other hand, in the case where control devices serving as a plurality of masters are provided on a bus, there is a phenomenon that transmission signals collide with each other on the bus. Accordingly, it is necessary to detect the collision because data cannot be normally transmitted and received through the bus and the data communications cannot be executed among the devices.

The disclosure has been made to solve the above-described problems, and an object thereof is to provide a light source control system capable of detecting a collision of data.

The other objects and novel features will become apparent from the description of the specification and the accompanying drawings.

According to an embodiment, a light source control system includes a plurality of light sources, and a plurality of light source control devices that is provided corresponding to the light sources and is provided communicable with each other through a bus. The light source control devices include a plurality of main light source control devices that transmits command signals to the other light source control devices. Each of the main light source control devices includes a collision determination circuit that determines whether or not data of the command signal transmitted through the bus has collided with another, and a restoration circuit that executes a restoration operation in the case where the data has collided with another on the basis of the determination result of the collision determination circuit. The collision determination circuit includes an edge detection circuit that detects change timing of a signal representing the data of the command signal, an area setting circuit that sets a collision determination area in accordance with the change timing detected by the edge detection circuit, and a collision detection circuit that detects the presence or absence of the collision of the data of the command signal in the collision determination area set by the area setting circuit.

According to an embodiment, a light source control system includes an edge detection circuit that detects change timing of a signal representing the data of the command signal, an area setting circuit that sets a collision determination area in accordance with the change timing detected by the edge detection circuit, and a collision detection circuit that detects the presence or absence of the collision of the data of the command signal in the collision determination area set by the area setting circuit, and thus the collision of the data can be detected.

BRIEF DESCRIPTION OF THE DRAWINGS

FIG. 4 is a diagram for describing a configuration of a collision determination circuit 13 on the basis of the first embodiment;

FIG. 5A and FIG. 5B are diagrams each describing a 1-bit data waveform on the basis of the first embodiment;

DETAILED DESCRIPTION

Figure 1:
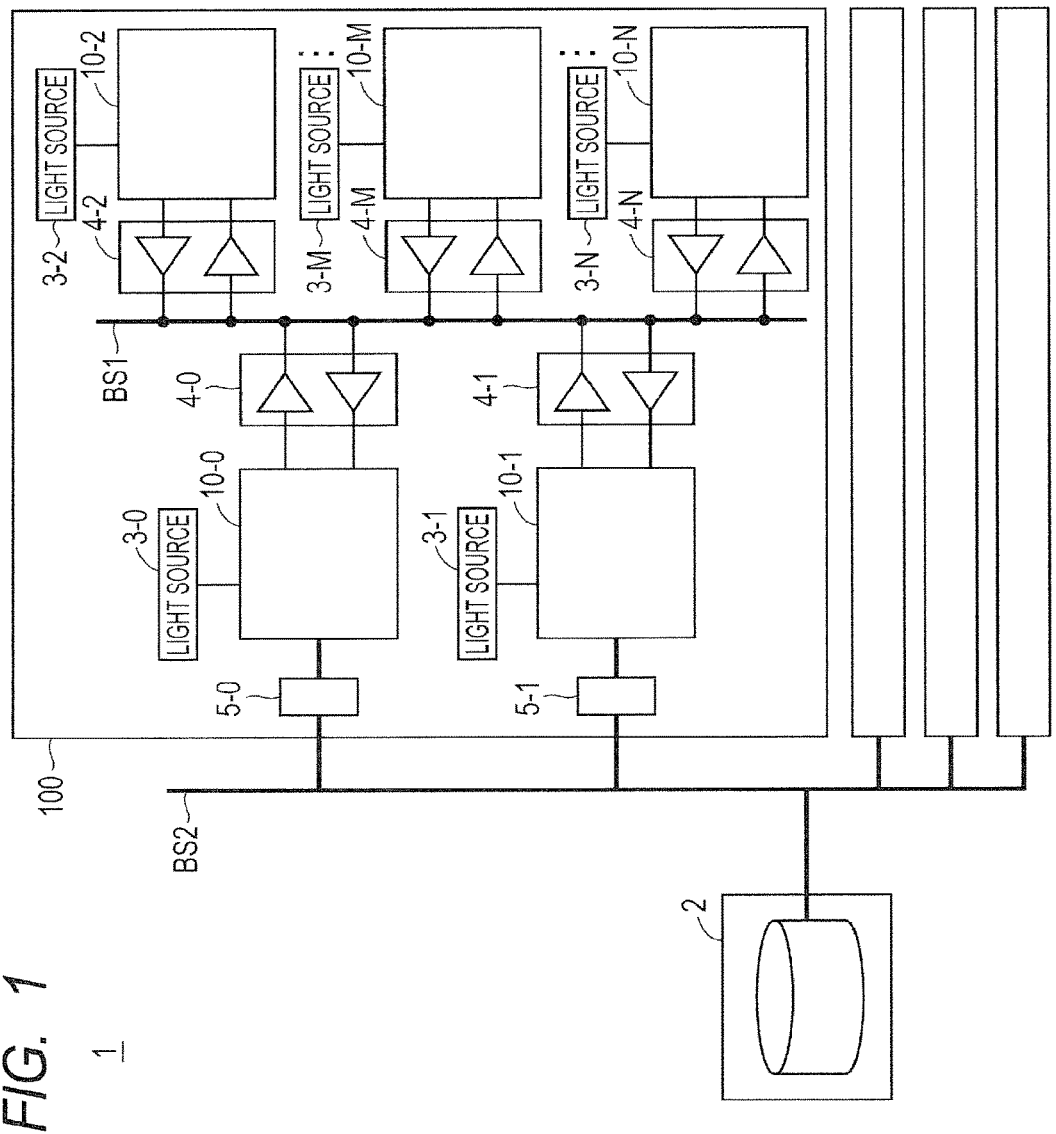
FIG. 1 is a diagram for describing a configuration of a light source control system 1 on the basis of a first embodiment.

Embodiments will be described in detail with reference to the drawings. It should be noted that the same or corresponding parts are followed by the same signs in the drawings, and the explanations thereof will not be repeated.

First Embodiment

<A. Entire Configuration>
<a1. Configuration of Light Source Control System 1>

FIG. 1 is a diagram for describing a configuration of a light source control system 1 on the basis of a first embodiment.

With reference to FIG. 1, the light source control system 1 includes a plurality of light source blocks 100 and a server 2.

The server 2 is coupled to the light source blocks 100 through a bus BS2.

Each of the light source blocks 100 is controlled by transmitting and receiving a signal compliant with the DALI standard through a bus BS1.

Each of the light source blocks 100 includes a plurality of light sources 3 and a plurality of controllers 10 provided corresponding to the respective light sources 3. Further, each of the light source blocks 100 further includes a plurality of communication interface modules 5 each of which is provided between the bus BS2 and the corresponding controller 10 while corresponding to each of the controllers 10, and a plurality of DALI communication interface modules 4 each of which is provided between the bus BS1 and the corresponding controller 10.

It should be noted that it is not necessary to provide the communication interface modules 5 and the controllers 10 on a one-to-one basis.

The bus BS1 and the bus BS2 are different from each other in the communication standard.

The DALI communication interface modules 4 are provided in such a manner that data can be transmitted and received through the bus BS2.

The controllers 10 control the light sources 3 on the basis of command signals for turning on or off the light sources 3 received through the DALI communication interface modules 4.

Further, the controllers 10 transmit information to the server 2 coupled to the bus BS2 through the communication interface modules 5. Further, the server 2 is provided communicable with the controllers 10 through the bus BS2.

It should be noted that one of the controllers 10 can be used as an alternative to the server 2.

The example shows a case in which N+1 light sources 3 are provided as an example. In addition, as a method of expressing 0-th to N-th light sources 3, the 0-th light source 3 is expressed as "light source 3-0" as an example. The same applies to the controllers 10, the DALI communication interface modules 4, and the communication interface modules 5.

Further, in the example, described is not a configuration in which one of the controllers 10 serves as a master and the other controllers 10 serve as slaves, but a configuration in which some controllers 10 serve as masters (multi-master) and the other controllers 10 serve as slaves.

Thus, a case in which a collision of data occurs on the bus BS1 will be described.

<a2. Configuration of Controller 10>

Figure 2:
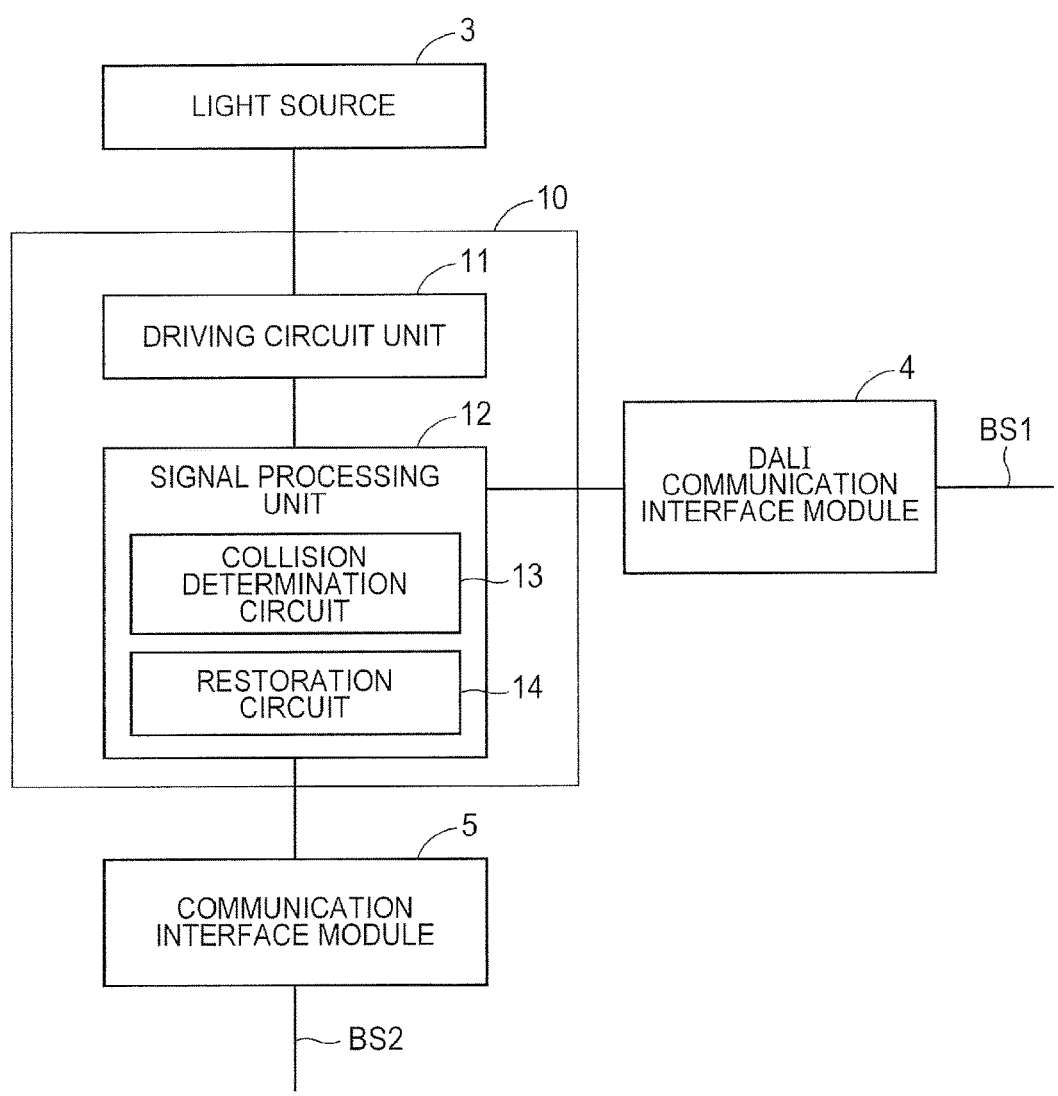
FIG. 2 is a diagram for describing a configuration of a controller 10 and peripheral circuits thereof on the basis of the first embodiment.

FIG. 2 is a diagram for describing a configuration of the controller 10 and peripheral circuits thereof on the basis of the first embodiment.

With reference to FIG. 2, the controller 10 that is a semiconductor device is coupled to the light source 3, the DALI communication interface module 4, and the communication interface module 5.

The DALI communication interface module 4 is provided communicable with the controller 10 that is another semiconductor device through the bus BS1 using a signal compliant with the DALI communication standard.

The communication interface module 5 is provided communicable with the server 2 through the bus BS2 using, for example, Ethernet (registered trademark) that is different from the DALI communication standard. It should be noted that the connection is not limited to the wired connection, but wireless connection can be adopted.

The controller 10 includes a driving circuit unit 11 and a signal processing unit 12.

The driving circuit unit 11 drives the light source 3.

The signal processing unit 12 instructs the driving circuit unit 11 by processing a signal received through the DALI communication interface module 4.

Further, the signal processing unit 12 includes a collision determination circuit 13 that determines whether or not data has collided with another, and a restoration circuit 14 that executes a restoration operation in the case where data has collided with another on the basis of the determination result of the collision determination circuit.

The driving circuit unit 11 executes light control such as turning on or off the light source 3 in accordance with the instruction from the signal processing unit 12.

Further, the signal processing unit 12 is coupled to the communication interface module 5, and transmits data to the server 2 if needed.

<a3. Configuration of DALI Communication Interface Module 4>

Figure 3:
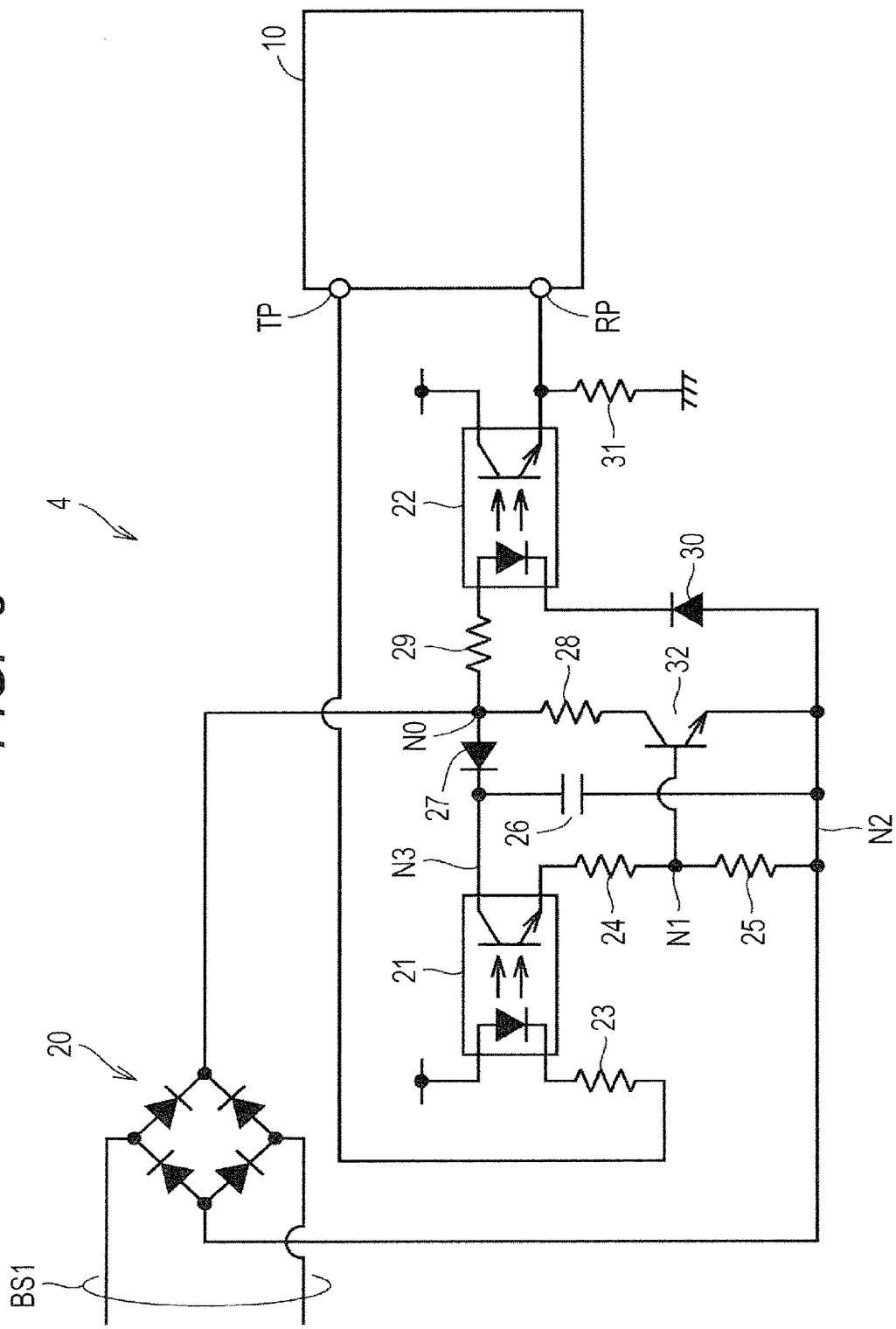
FIG. 3 is a diagram for describing a configuration of a DALI communication interface module 4 on the basis of the first embodiment.

FIG. 3 is a diagram for describing a configuration of the DALI communication interface module 4 on the basis of the first embodiment.

With reference to FIG. 3, the DALI communication interface module 4 includes a diode bridge 20, photocouplers 21 and 22, resistors 23, 24, 25, 28, 29, and 31, a capacitor 26, a diode 27, a Zener diode 30, and a bipolar transistor 32.

The diode bridge 20 is coupled to the bus BS1 configured using two lines and nodes N0 and N2.

A transmission terminal TP of the controller 10 is coupled to the photocoupler 21 through the resistor 23.

The photocoupler 21 includes a light emitting diode and a phototransistor. The light emitting diode is provided between the power supply voltage and the resistor 23. One end of the phototransistor is coupled to a node N3. The other end thereof is coupled to a node N1 through the resistor 24.

The resistor 25 is coupled between the node N2 and the node N1. The resistor 28 is coupled to the bipolar transistor 32 in series between the node N0 and the node N2. The gate electrode of the bipolar transistor 32 is coupled to the node N1. The diode 27 is provided between the node N3 and the node NO. The capacitor 26 is coupled between the node N3 and the node N2.

The node N0 is coupled to the photocoupler 22 through the resistor 29.

The photocoupler 22 includes a light emitting diode and a phototransistor.

The anode side of the light emitting diode is coupled to the resistor 29. The cathode side thereof is coupled to the Zener diode 30.

One end of the photocoupler 22 is coupled to the power supply voltage. The other end thereof is coupled to a reception terminal RP of the controller 10. Further, the resistor 31 is coupled between the reception terminal RP and the grounding voltage.

In the embodiment, it is determined whether or not a collision of data has occurred on the basis of a signal received through the DALI communication interface module 4.

<a4. Configuration of Collision Determination Circuit 13>

FIG. 4 is a diagram for describing a configuration of the collision determination circuit 13 on the basis of the first embodiment.

With reference to FIG. 4, the collision determination circuit 13 includes an edge detection circuit 301 coupled to a reception terminal, a bit boundary determination circuit 302, a time counter circuit 303, a comparison circuit 304, a register group 305, an area counter circuit 306, and a collision detection circuit 307.

The edge detection circuit 301 detects the rise or fall (edge) of a signal received through the reception terminal.

The bit boundary determination circuit 302 determines whether or not the edge is an edge of a bit boundary.

The time counter circuit 303 counts time in accordance with the detection of the edge.

The comparison circuit 304 compares the count value from the time counter circuit 303 with a predetermined value set by the register group 305. In the case where the count value is equal to or larger than the predetermined value, the comparison circuit 304 outputs a comparison result signal to the area counter circuit 306.

The area counter circuit 306 increments an area counter on the basis of the comparison result signal from the comparison circuit 304.

The collision detection circuit 307 executes collision determination on the basis of an area counter value from the area counter circuit 306 and an edge detection signal from the edge detection circuit 301.

In the case where it is determined that a collision has occurred by executing the collision determination, the collision detection circuit 307 outputs a collision interruption signal.

As an example, the time counter circuit 303, the comparison circuit 304, the register group 305, and the area counter circuit 306 configure an area setting circuit that sets a collision determination area in accordance with change timing detected by the edge detection circuit 301.

<B. Description of Collision Determination>
<b1. Data Determination>

FIG. 5A and FIG. 5B are diagrams each describing a data waveform of one bit on the basis of the first embodiment.

With reference to FIG. 5A, it is assumed that the Manchester coding is applied to communication data compliant with the DALI standard in the example.

Here, a data waveform in the case of data "0" is shown.

In the case of a normal waveform, shown is a data waveform falling from the "H" level to the "L" level around nearly the middle of a cycle period assigned to one bit.

In the example, when detecting a fall edge (change timing) from the "H" level to the "L" level, the data is assumed as data "0" as an example.

As similar to the above, with reference to FIG. 5B, a data waveform in the case of data "1" is shown.

In the case of a normal waveform, shown is a data waveform rising from the "L" level to the "H" level around nearly the middle of a cycle period assigned to one bit.

In the example, when detecting a rise edge (change timing) from the "L" level to the "H" level, the data is assumed as data "1" as an example.

<b2. Collision Determination>

Figure 6A:
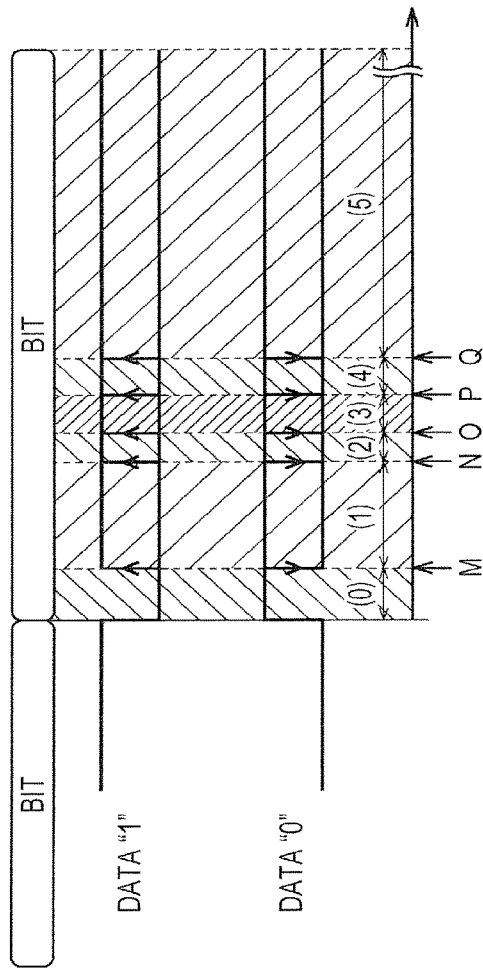
FIG. 6A and FIG. 6B are diagrams each describing a method of determining a collision of 1-bit data on the basis of the first embodiment.
Figure 6B:
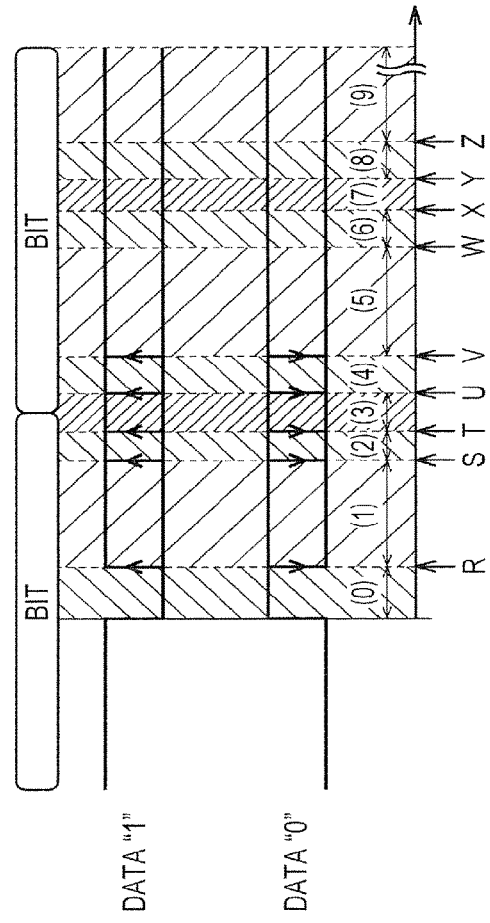

FIG. 6A and FIG. 6B are diagrams each describing a method of determining a collision of 1-bit data on the basis of the first embodiment.

With reference FIG. 6A, the example shows a case in which a collision between the data "0" and data "1" is determined.

Since the Manchester coding is applied to the communication data, there are two situations in which the edge corresponds to a bit boundary and the edge represents data.

In this case, data collision determination (first collision determination) in the case where the edge detected first corresponds to a bit boundary will be described.

Sections (0) to (5) are assigned. The length of each section is stored in the register group 305.

Specifically, in the case where the edge corresponds to a bit boundary, a section from the bit boundary to a timing value M is assigned to the section (0).

A section between timing values M and N, a section between timing values N and O, a section between timing values O and P, a section between timing values P and Q, and a section subsequent to the timing value Q are assigned to the sections (1), (2), (3), (4), and (5), respectively.

The section (1) and the section (5) are destroy sections. In the case where the edge is detected in one of the sections, it is determined that a collision has occurred.

The section (3) is an effective section. The detection of the edge in the section indicates data, and it is determined that no collision has occurred.

The sections (0), (2), and (4) are gray sections, and can be variably set to any one of the destroy sections and the effective sections.

As an example, a case in which the gray section is set to the destroy section will be described.

With reference to FIG. 6B, data collision determination (second collision determination) in the case where the edge detected first is in the middle of a bit will be described.

The example shows a case in which a collision between data "1" and data "0" is determined.

Sections (0) to (9) are assigned. The length of each section is stored in the register group 305.

Specifically, in the case where the edge corresponds to the middle of a bit, a section from the middle of the bit to a timing value R is assigned to the section (0).

A section between timing values R and S, a section between timing values S and T, a section between timing values T and U, a section between timing values U and V, a section between timing values V and W, a section between timing values W and X, a section between timing values X and Y, a section between timing values Y and Z, and a section subsequent to the timing value Z are assigned to the sections (1), (2), (3), (4), (5), (6), (7), (8), and (9), respectively.

The section (1), the section (5), and the section (9) are the destroy sections. In the case where the edge is detected in one of the sections, it is determined that a collision has occurred.

The section (3) and the section (7) are the effective sections. The detection of the edge in one of the sections indicates data or a bit boundary, and it is determined that no collision has occurred.

The sections (0), (2), (4), (6), and (8) are the gray sections, and can be variably set to any one of the destroy sections and the effective sections.

As an example, a case in which the gray section is set to the destroy section will be described.

It should be noted that the timing values of the first collision determination and the second collision determination are stored in the register group 305.

<b3. Flow>

Figure 7:
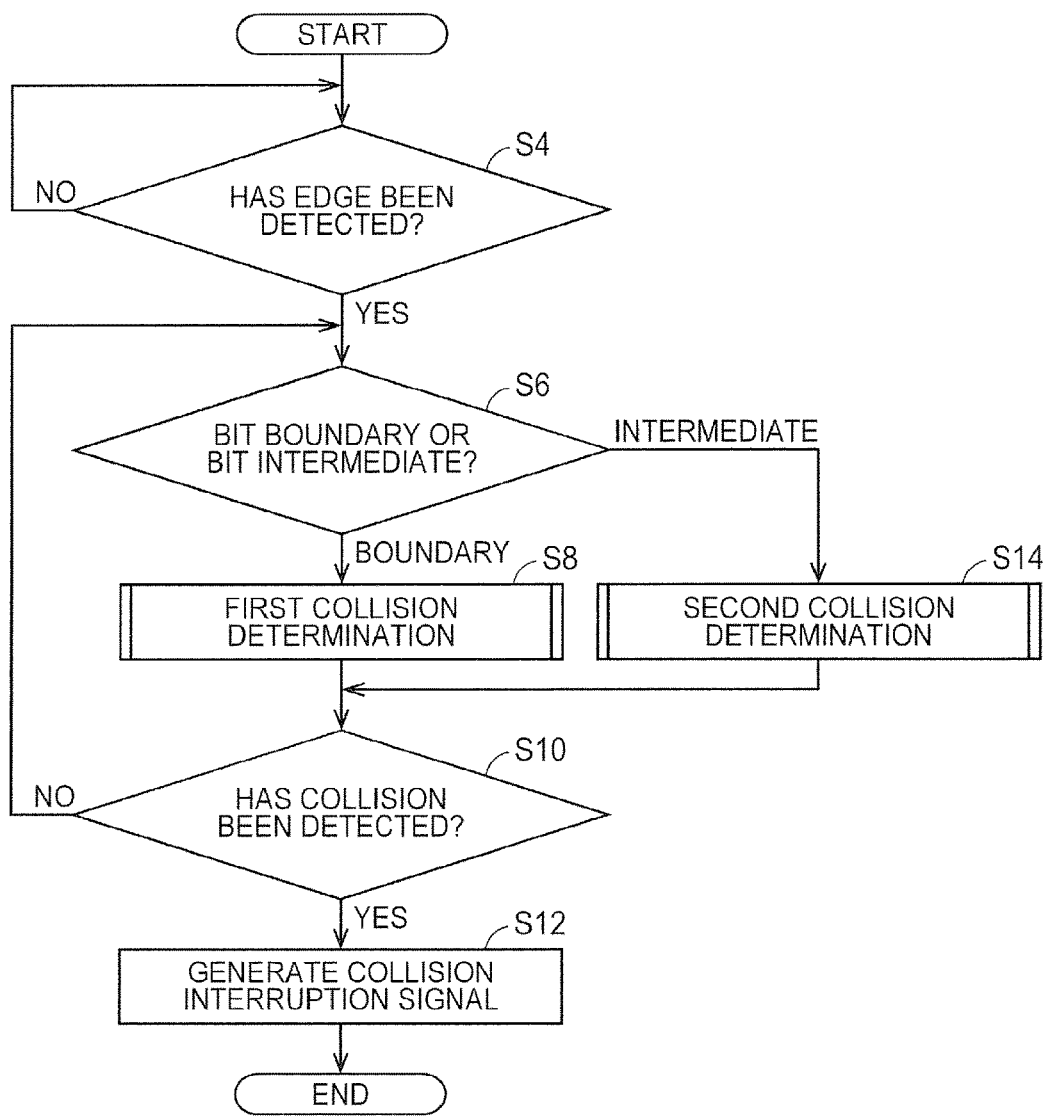
FIG. 7 is a flowchart for executing a collision determination process on the basis of the first embodiment.

FIG. 7 is a flowchart for executing a collision determination process on the basis of the first embodiment.

The process is a process in the collision determination circuit 13 of the controller 10.

With reference to FIG. 7, the collision determination circuit 13 determines whether or not an edge has been detected through the reception terminal (Step S4). Specifically, the edge detection circuit 301 determines whether or not an edge has been detected through the reception terminal, and outputs a detection signal to each of the bit boundary determination circuit 302, the time counter circuit 303, the area counter circuit 306, and the collision detection circuit 307.

In Step S4, the collision determination circuit 13 maintains Step S4 until the edge is detected (NO in Step S4).

In addition, in the case where the collision determination circuit 13 detects the edge (YES in Step S4), it is determined that the edge corresponds to the bit boundary or the middle of the bit (Step S6). The bit boundary determination circuit 302 determines whether or not the edge corresponds to the bit boundary in accordance with a detection signal of the edge from the edge detection circuit 301. The first edge from the start of communications is a start bit, and thus it is determined that the edge corresponds to the bit boundary. Then, the flow returns to Step S6 without performing the collision determination.

In the case where it is determined that the edge corresponds to the bit boundary in Step S6, the collision determination circuit 13 executes the first collision determination (Step S8).

Specifically, the collision determination in the sections (0) to (5) described using FIG. 6A is executed. The first collision determination will be described later.

Next, the collision determination circuit 13 determines whether or not a collision has been detected (Step S10). The collision detection circuit 307 executes the first collision determination to determine whether or not a collision has been detected.

In the case where the collision determination circuit 13 determines that the collision has been detected in Step S10 (YES in Step S10), the collision interruption signal is generated (Step S12). In the case where the collision detection circuit 307 determines that the collision has been detected, the collision interruption signal is generated. Then, the process is completed (end).

On the other hand, in the case where the collision determination circuit 13 determines that no collision has been detected in Step S10 (NO in Step S10), the flow returns to Step S6 to execute the above-described first or second collision determination.

On the other hand, in the case where the collision determination circuit 13 determines that the edge corresponds to the middle of the bit in Step S6, the second collision determination is executed (Step S14).

Specifically, the collision determination in the sections (0) to (9) described using FIG. 6B is executed. The second collision determination will be described later.

Next, the collision determination circuit 13 determines whether or not the collision has been detected (Step S10). The collision detection circuit 307 executes the second collision determination to determine whether or not the collision has been detected.

In the case where the collision determination circuit 13 determines that the collision has been detected in Step S10 (YES in Step S10), the collision interruption signal is generated (Step S12). In the case where the collision detection circuit 307 determines that the collision has been detected, the collision interruption signal is generated. Then, the process is completed (end).

On the other hand, in the case where the collision determination circuit 13 determines that no collision has been detected in Step S10 (NO in Step S10), the flow returns to Step S6.

Figure 8:
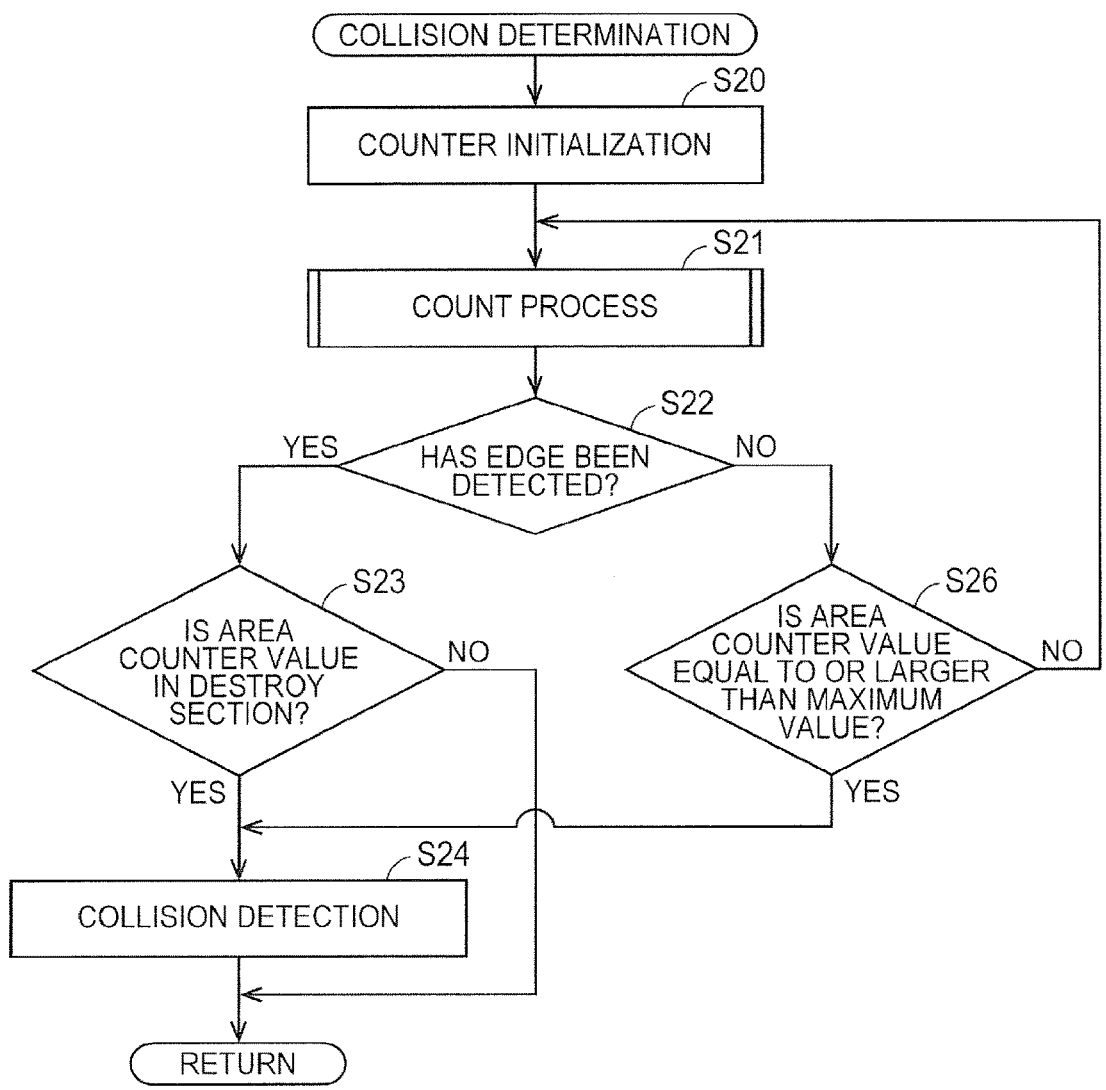
FIG. 8 is a flowchart for executing first collision determination and second collision determination of the collision determination circuit 13 on the basis of the first embodiment.

FIG. 8 is a flowchart for executing the first collision determination and the second collision determination of the collision determination circuit 13 on the basis of the first embodiment.

With reference to FIG. 8, a counter value is initialized (Step S20). Specifically, the time counter circuit 303 and the area counter circuit 306 are initialized (reset). The value of the initialization can be set to 0.

Next, a count process is executed (Step S21). The detail of the count process will be described later.

Next, it is determined whether or not the edge has been detected through the reception terminal (Step S22). Specifically, the edge detection circuit 301 determines whether or not the edge has been detected through the reception terminal. In the case where the edge has been detected, a detection signal is output to each of the bit boundary determination circuit 302, the time counter circuit 303, the area counter circuit 306, and the collision detection circuit 307.

In the case where the collision determination circuit 13 determines that no edge has been detected in Step S22 (NO in step S22), it is determined whether or not the area counter value is equal to or larger than the maximum value (Step S26).

In the example, the maximum value is set in each of the first collision determination and the second collision determination. Specifically, in the case of the first collision determination, the maximum value is set to "5". Further, in the case of the second collision determination, the maximum value is set to "9".

In the case where it is determined that the area counter value is equal to or larger than the maximum value in Step S26 (YES in Step S26), it is determined that the collision has been detected (Step S24).

Then, the process is completed (return).

On the other hand, in the case where it is determined that the area counter value is smaller than the maximum value in Step S26 (NO in Step S26), the flow returns to Step S21 to continue the count process.

On the other hand, in the case where the collision determination circuit 13 determines that the edge has been detected in Step S22 (YES in Step S22), it is determined whether or not the area counter value is in the destroy section (Step S23).

In the case where it is determined that the area counter value is in the destroy section in Step S23 (YES in Step S23), it is determined that the collision has been detected (Step S24).

Then, the process is completed (return).

On the other hand, in the case where it is determined that the area counter value is not in the destroy section in Step S23 (NO in Step S23), Step S24 is skipped to complete the process (return). In this case, the edge has been detected in the effective section, and no collision has occurred.

For example, the detection of the edge in the section (3) in the first collision determination means the detection in the effective section, and no collision has occurred.

Then, it is determined that no collision has been detected in Step S10 of FIG. 7, and the flow returns to Step S6 to repeat the same process. For example, in the case where the edge has been detected in the section (3) in the first collision determination, the second collision determination is executed next time.

For example, the detection of the edge in the section (3) in the second collision determination means the detection in the effective section, and no collision has occurred.

Then, it is determined that no collision has been detected in Step S10 of FIG. 7, and the flow returns to Step S6 to repeat the same process. For example, in the case where the edge has been detected in the section (3) in the second collision determination, the first collision determination is executed next time.

Further, the detection of the edge in the section (7) in the second collision determination means the detection in the effective section, and no collision has occurred.

Then, it is determined that no collision has been detected in Step S10 of FIG. 7, and the flow returns to Step S6 to repeat the same process. For example, in the case where the edge has been detected in the section (7) in the second collision determination, the second collision determination is executed next time.

Figure 9:
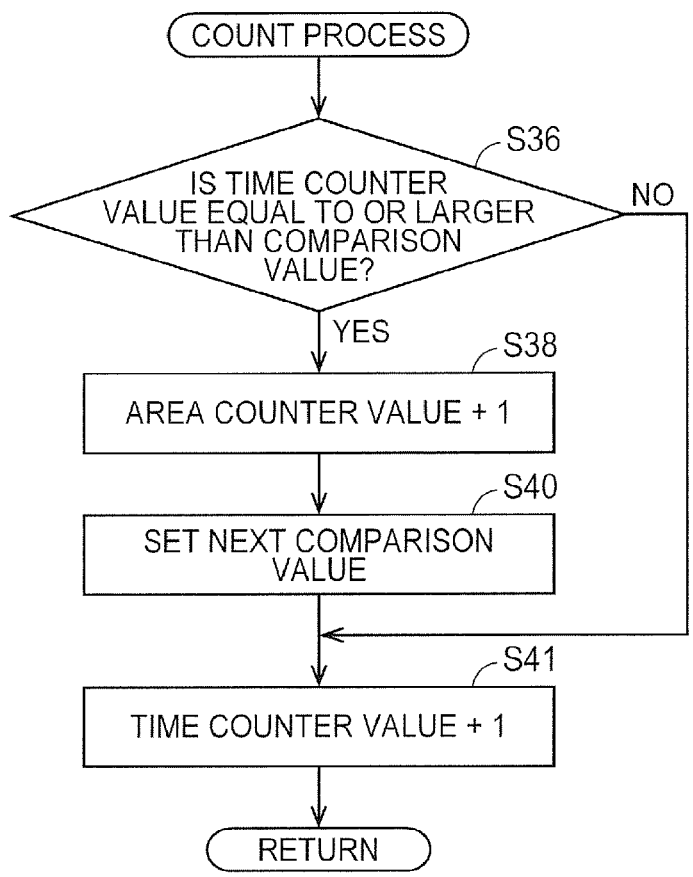
FIG. 9 is a flowchart for describing a subroutine process of a count process on the basis of the first embodiment.

FIG. 9 is a flowchart for describing a subroutine process of the count process on the basis of the first embodiment.

With reference to FIG. 9, it is determined that a time counter value is equal to or larger than a comparison value (Step S36). The comparison circuit 304 compares the time counter value of the time counter circuit 303 with the comparison value to determine whether or not the time counter value is equal to or larger than the comparison value.

It should be noted that it is assumed that the initialization value of the comparison value is set by the register group 305. Specifically, in the case of the first collision determination, the timing value M is set. In the case of the second collision determination, the timing value R is set.

In the case where it is determined that the time counter value is smaller than the comparison value in Step S36 (NO in Step S36), Steps S38 and S40 are skipped to proceed to Step S41.

In Step S41, the time counter circuit 303 counts up the time counter value.

Then, the process is completed (return).

On the other hand, in the case where it is determined that the time counter value is equal to or larger than the comparison value in Step S36 (YES in Step S36), the area counter value is counted up (Step S38). Specifically, the comparison circuit 304 outputs a signal on the basis of the comparison result to the area counter circuit 306. The area counter circuit 306 counts up the area counter value on the basis of the signal on the basis of the comparison result. The initialization value is 0 and represents the section (0).

Next, the comparison value is set (Step S40).

Specifically, the register group 305 sets the next comparison value stored in the register group 305 to the comparison circuit 304 in response to the signal on the basis of the comparison result.

Next, the time counter circuit 303 counts up the time counter value in Step S41.

Then, the process is completed (return).

For example, in the case where the time counter value has reached the timing value M, the area counter value is counted up. Namely, the section is transited from the section (0) to the section (1). As similar to the above, in the case where the time counter value has reached the timing value N, the area counter value is counted up. Namely, the section is transited from the section (1) to the section (2).

It is possible to recognize the current section by the process.

Thus, in the case where the area counter value is counted up and reaches the maximum value or larger, it can be determined that the collision has occurred in the first collision determination and the second collision determination.

<C. Description of Restoration Process>

A restoration process in the case where a collision has occurred will be described.

In the case where a collision has occurred, data cannot be normally transmitted and received. Thus, the fact is notified to the other masters to stop the transmission of the data.

Then, a restoration process of executing the transmission operation again after a predetermined period elapses is executed.

Figure 10:
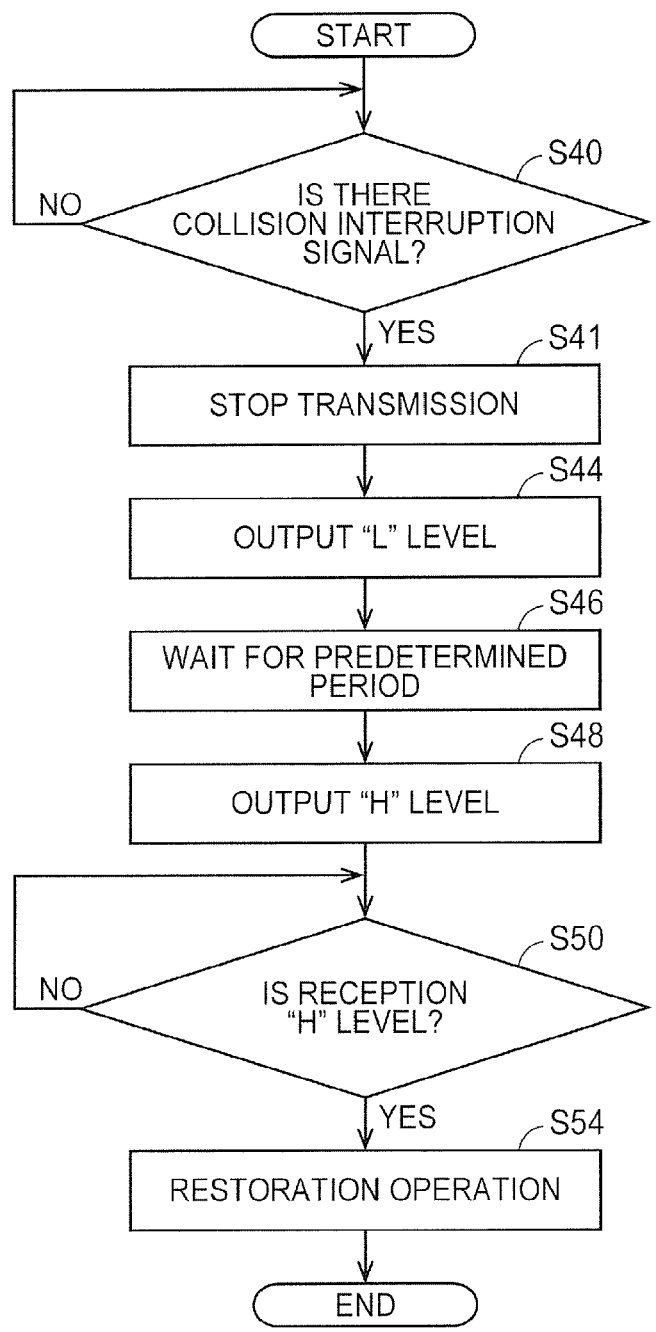
FIG. 10 is a flowchart for describing a restoration process on the basis of the first embodiment.

FIG. 10 is a flowchart for describing the restoration process on the basis of the first embodiment.

With reference to FIG. 10, the process is mainly executed by the restoration circuit 14 of the controller 10.

The restoration circuit 14 determines whether or not the collision interruption signal is present (Step S40).

Specifically, the restoration circuit 14 determines whether or not an input of the collision interruption signal from the collision determination circuit 13 is present.

In the case where the restoration circuit 14 determines that an input of the collision interruption signal from the collision determination circuit 13 is present in Step S40 (YES in Step S40), the transmission is stopped (Step S41). The restoration circuit 14 stops the transmission of data to the bus BS1 through the DALI communication interface module 4.

Next, the restoration circuit 14 outputs data of the "L" level to the bus BS1 through the DALI communication interface module 4 (Step S44).

Then, the restoration circuit 14 waits for a predetermined period in the state (Step S46).

Accordingly, a collision of transmission data of the other controllers 10 that are the other masters occurs, and the occurrence of the collision of the other controllers 10 that are the other masters on the bus BS1 is detected.

Then, the same process is executed.

Next, the restoration circuit 14 outputs data of the "H" level to the bus BS1 through the DALI communication interface module 4 (Step S48).

Next, the restoration circuit 14 determines whether or not a reception signal from the bus BS1 through the DALI communication interface module 4 is of the "H" level (Step S50).

In the case where the restoration circuit 14 determines that the reception signal is of the "H" level in Step S50 (YES in Step S50), it can be determined that data of the "L" level has not been output from the other controllers 10 that are the other masters.

Then, the restoration circuit 14 executes the restoration operation (Step S54). Specifically, the transmission of data from the controller 10 is started again. It should be noted that in order to suppress a collision of data with the other controllers 10 at the time of the restoration operation, the restoration operation may be started after further waiting for a predetermined period.

Then, the process is completed (end).

On the other hand, in the case where the restoration circuit 14 determines that the reception signal is not of the "H" level in Step S50 (NO in Step S50), it can be determined that data of the "L" level has been output from the other controllers 10 that are the other masters. In this case, the restoration circuit 14 waits until the reception signal becomes the "H" level.

Then, the restoration circuit 14 waits until the reception signal becomes the "H" level in Step S50. After the reception signal becomes the "H" level, the above-described restoration operation is executed.

Then, the process is completed (end).

In the case where a collision of data with the other masters occurs, the occurrence of the collision can be suppressed by the process by avoiding a situation in which the collision continuously occurs, and stable data communications can be executed.

It should be noted that the timing values are stored in the register group 305 in the above description of the embodiment. However, the present invention is not limited to the timing values, but difference values of the sections may be stored. Further, the timing values can be arbitrarily changed, and the sections (boundary values) can be freely set.

Thus, the sections can be adjusted in accordance with variations in the respective light source blocks 100 and components of the light source control system 1. Further, stable data communications can be executed by adjusting the sections in accordance with electric characteristics and aged deterioration.

Further, the example describes a method of determining an area on the basis of the timing of detection of the edge using the area counter circuit 306. However, the section of the timing of detection of the edge can be determined only by the time count value of the time counter circuit 303. In addition, a collision can be determined on the basis of the determination.

Second Embodiment

<a5. Configuration of Collision Determination Circuit 13#>

Figure 11:
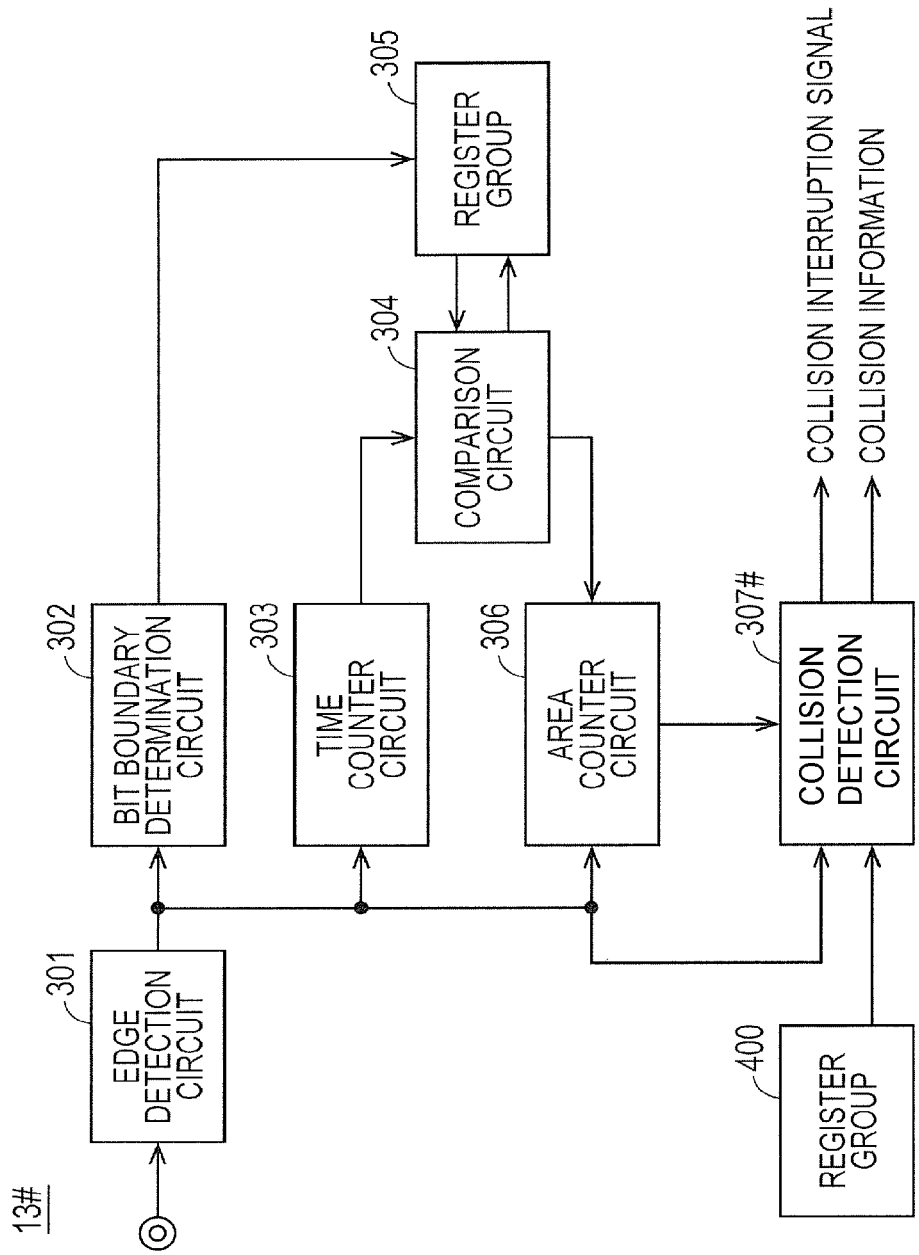
FIG. 11 is a diagram for describing a configuration of a collision determination circuit 13# on the basis of a second embodiment.

FIG. 11 is a diagram for describing a configuration of a collision determination circuit 13# on the basis of a second embodiment.

With reference to FIG. 11, the collision determination circuit 13# is different from the collision determination circuit 13 of FIG. 4 in that a register group 400 is provided and the collision detection circuit 307 is replaced by a collision detection circuit 307#. The other configurations are the same as those described in FIG. 4, and thus the detailed explanations thereof will not be repeated.

The register group 400 is a register that can set the gray section described in FIG. 6 to the effective section or the destroy section.

The collision detection circuit 307# executes the first collision determination and second collision determination on the basis of information set by the register group 400.

<b4. Flow>

Figure 12:
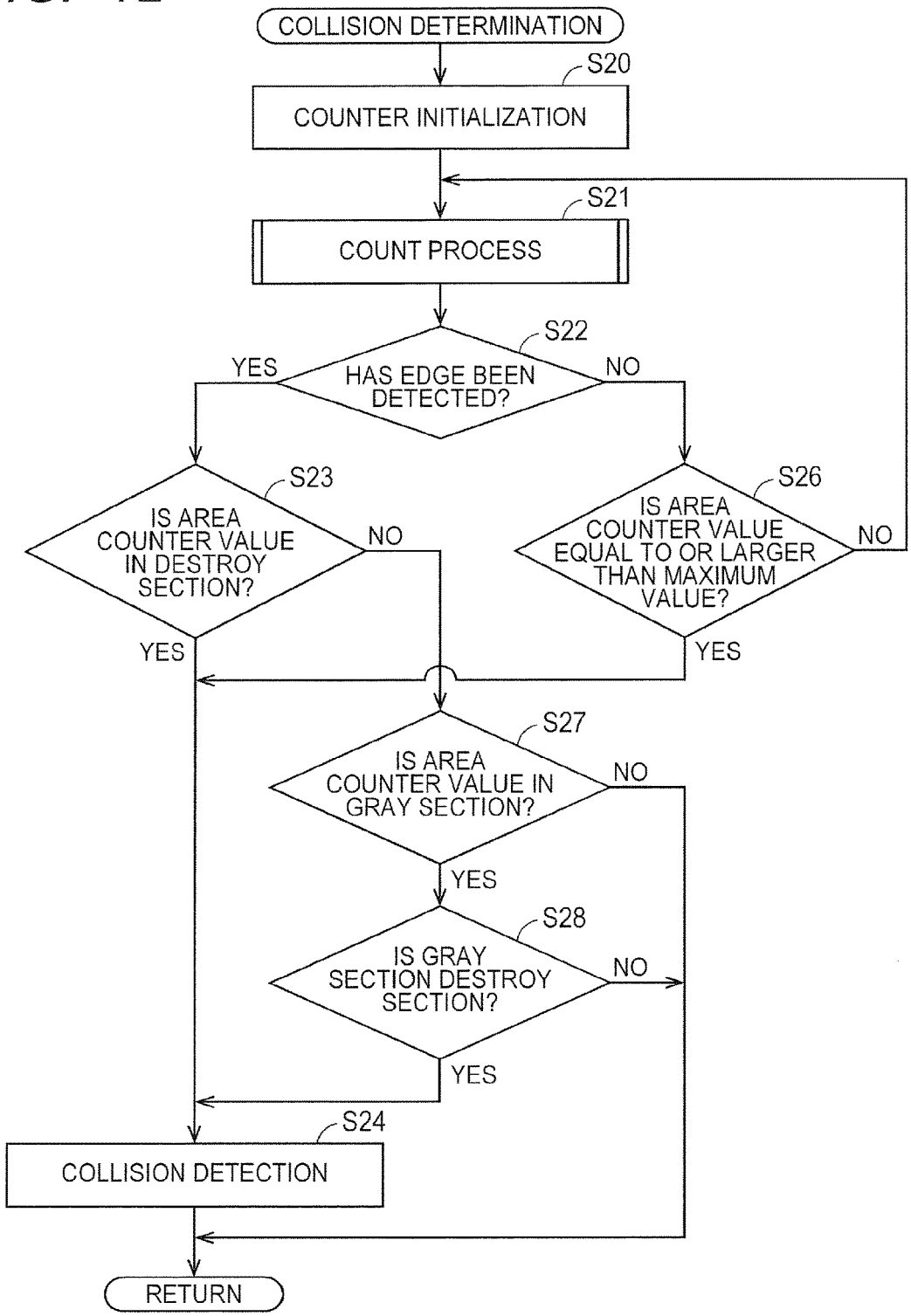
FIG. 12 is a flowchart for executing first collision determination and second collision determination of the collision determination circuit 13# on the basis of the second embodiment.

FIG. 12 is a flowchart for executing the first collision determination and second collision determination of the collision determination circuit 13# on the basis of the second embodiment.

The flowchart of FIG. 12 is different from that described in FIG. 8 in that Steps S27 and S28 are added. The other flows are the same, and thus the detailed explanations thereof will not be repeated.

In the case where it is determined that the area counter value is not in the destroy section in Step S23 (NO in Step S23), it is determined whether or not the area counter value is in the gray section (Step S27). The determination can be made on the basis of the set information stored in the register group 400.

In the case where it is determined that the area counter value is not in the gray section in Step S27 (NO in Step S27), Step S24 is skipped to complete the process (return). In this case, the edge has been detected in the effective section, and no collision has occurred.

On the other hand, in the case where it is determined that the area counter value is in the gray section in Step S27 (YES in Step S27), it is determined whether or not the gray section is the destroy section (Step S28). The determination can be made on the basis of the set information stored in the register group 400.

In the case where it is determined that the gray section is the destroy section in Step S28 (YES in Step S28), it is determined that the collision has been detected (Step S24).

On the other hand, in the case where it is determined that the gray section is not the destroy section in Step S28 (NO in Step S28), Step S24 is skipped to complete the process (return). In this case, the edge is regarded as having been detected in the effective section, and no collision has occurred.

For example, in the case where the sections (2) and (4) are set to the effective sections by the register group 400 in the first collision determination and the edge has been detected in the sections, the edge has been detected in the effective section, and no collision has occurred.

Then, it is determined that no collision has been detected in Step S10 of FIG. 7, and the flow returns to Step S6 to repeat the same process. For example, in the case where the edge has been detected in the section (3) in the first collision determination, the second collision determination is executed next time.

The degree of freedom of a design by users can be improved by variably setting the gray section to the effective section or the destroy section.

Third Embodiment

In the above-described embodiment, the method of executing the restoration operation in accordance with an input of the collision interruption signal has been described. A method of executing a restoration operation with higher accuracy will be described.

Specifically, the collision detection circuit 307# generates collision information together with the collision interruption signal to be output to the restoration circuit 14.

The restoration circuit 14 executes the restoration operation on the basis of the collision interruption signal and the collision information.

FIGS. 13A, 13B, 13C and 13D are diagrams each describing an example in which a collision occurs in the middle of a bit on the basis of a third embodiment.

With reference to FIGS. 13A, 13B, 13C and 13D, examples of a transmission signal, a reception signal (normal), a reception signal (collision), and a collision interruption signal are shown.

Figure 13A:
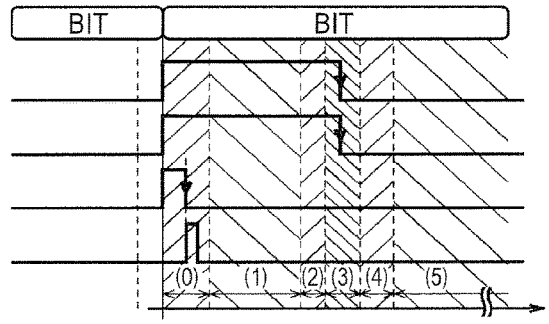
FIGS. 13A, 13B, 13C and 13D are diagrams each describing an example in which a collision has occurred in the middle of a bit on the basis of a third embodiment.

With reference to FIG. 13A, a case in which data "0" has been output as transmission data is shown.

The reception signal in a normal condition falls in the section (3).

On the other hand, a case in which the reception signal in a collision condition falls in the section (0) is shown.

Then, a case in which the collision interruption signal is generated in response thereto is shown.

In this case, the collision information is generated together with the collision interruption signal.

For example, as the collision information, information related to the level of the transmission signal at the time of detecting the collision and the rise or fall of the edge of the reception signal, information related to whether or not the collision determination arises from the edge, information related to the collision determination, and information related to the collision detection section are generated.

When the collision determination does not arise from the edge, no edge has been detected and the section is the destroy section.

In the example, as the collision information, the transmission signal at the time of detecting the collision is of the "H" level. The edge of the reception signal falls from the "H" level to the "L" level. The collision determination arises from the edge. The collision determination is the first collision determination. The collision detection section is the section (0).

The collision arises from a normal data collision.

Figure 13B:
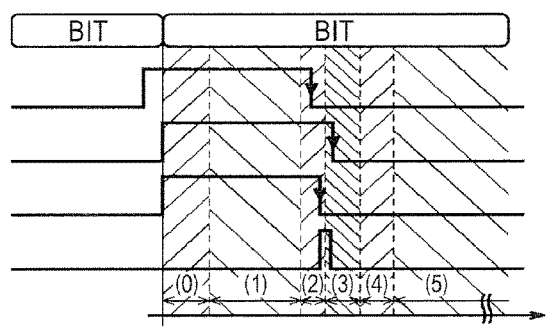

With reference to FIG. 13B, a case in which the data "0" has been output as transmission data is shown.

The reception signal in a normal condition falls in the section (3).

On the other hand, a case in which the reception signal in a collision condition falls in the section (2) is shown.

Then, a case in which the collision interruption signal is generated in response thereto is shown.

In this case, the collision information is generated together with the collision interruption signal.

In the example, as the collision information, the transmission signal at the time of detecting the collision is of the "L" level. The edge of the reception signal falls from the "H" level to the "L" level. The collision determination arises from the edge. The collision determination is the first collision determination. The collision detection section is the section (2).

Although the reception signal in a normal condition falls in the section (3), the reception signal falls before the section (3). Accordingly, the collision arises from not delay of data but a normal data collision.

Figure 13C:
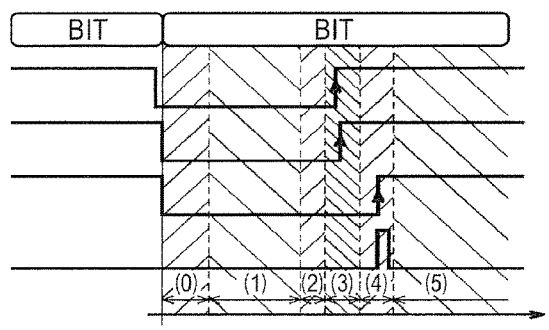

With reference to FIG. 13C, a case in which data "1" has been output as transmission data is shown.

Further, the reception signal in a normal condition rises in the section (3).

On the other hand, a case in which the reception signal in a collision condition rises in the section (4) is shown.

Then, a case in which the collision interruption signal is generated in response thereto is shown.

In this case, the collision information is generated together with the collision interruption signal.

In the example, as the collision information, the transmission signal at the time of detecting the collision is of the "H" level. The edge of the reception signal rises from the "L" level to the "H" level. The collision determination arises from the edge. The collision determination is the first collision determination. The collision detection section is the section (4).

Although the reception signal in a normal condition rises in the section (3), the reception signal rises after the section (3). Accordingly, there is a high possibility that the collision arises from delay of data. Thus, it can be determined that no collision has occurred.

Figure 13D:
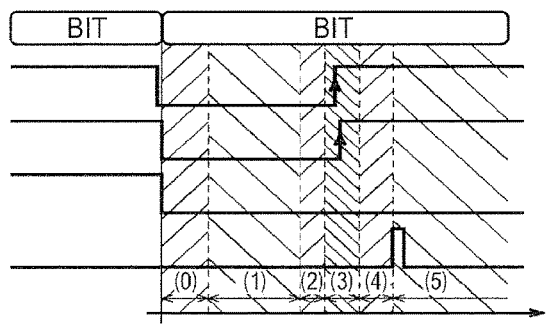

With reference to FIG. 13D, a case in which the data "1" has been output as transmission data is shown.

Further, the reception signal in a normal condition rises in the section (3).

On the other hand, a case in which the reception signal in a collision condition does not rise even after the section (5) is shown.

Then, a case in which the collision interruption signal is generated in response thereto is shown.

In this case, the collision information is generated together with the collision interruption signal.

In the example, as the collision information, the transmission signal at the time of detecting the collision is of the "H" level. The edge of the reception signal is not generated, and thus is invalid. The collision determination does not arise from the edge. The collision determination is the first collision determination. The collision detection section is the section (5).

Although the reception signal in a normal condition rises in the section (3), no rise is detected. Accordingly, the collision arises from a data collision.

Figure 14:
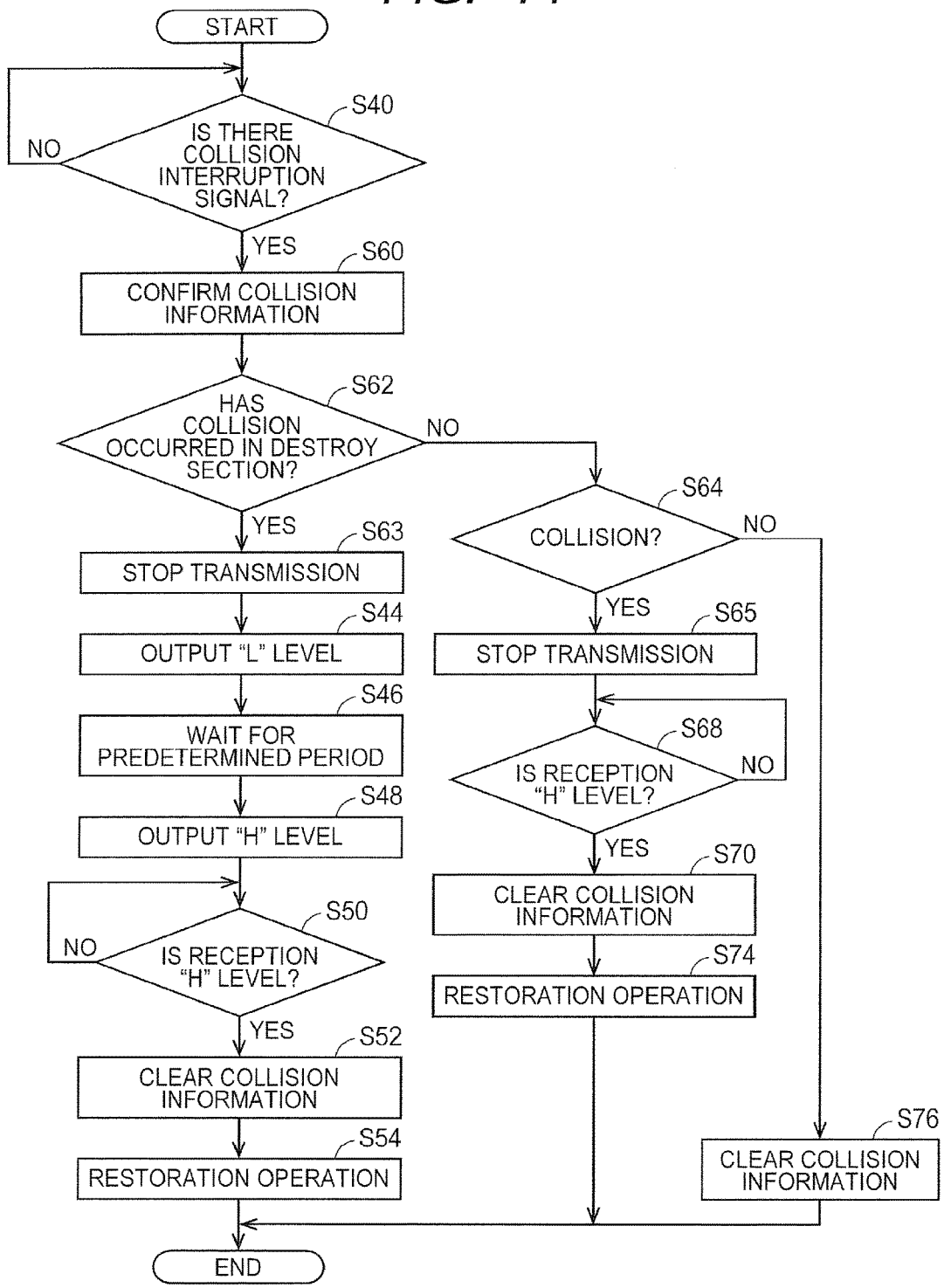
FIG. 14 is a flowchart for describing a restoration process on the basis of the third embodiment.

FIG. 14 is a flowchart for describing a restoration process on the basis of the third embodiment.

With reference to FIG. 14, the process is mainly executed by the restoration circuit 14 of the controller 10.

The restoration circuit 14 determines whether or not the collision interruption signal is present (Step S40).

Specifically, the restoration circuit 14 determines whether or not an input of the collision interruption signal from the collision determination circuit 13 is present.

In the case where the restoration circuit 14 determines that an input of the collision interruption signal from the collision determination circuit 13 is present in Step S40 (YES in Step S40), the collision information is confirmed (Step S60). The restoration circuit 14 confirms the content of the collision information output from the collision detection circuit 307#.

Next, the restoration circuit 14 determines whether or not the collision has occurred in the destroy section (Step S62). The restoration circuit 14 confirms the above-described collision detection section to determine whether or not the collision has occurred in the destroy section. In the case of FIG. 13D, the collision detection section is the section (5), and is determined as the destroy section.

Next, in the case where the restoration circuit 14 determines that the collision has occurred in the destroy section (YES in Step S62), the transmission is stopped (Step S63). The restoration circuit 14 stops the transmission of data to the bus BS1 through the DALI communication interface module 4.

Next, the restoration circuit 14 outputs data of the "L" level to the bus BS1 through the DALI communication interface module 4 (Step S44).

Then, the restoration circuit 14 waits for a predetermined period in the state (Step S46).

Accordingly, a collision of transmission data of the other controllers 10 that are the other masters occurs, and the occurrence of the collision of the other controllers 10 that are the other masters on the bus BS1 is detected.

Then, the same process is executed.

Next, the restoration circuit 14 outputs data of the "H" level to the bus BS1 through the DALI communication interface module 4 (Step S48).

Next, the restoration circuit 14 determines whether or not a reception signal from the bus BS1 through the DALI communication interface module 4 is of the "H" level (Step S50).

In the case where the restoration circuit 14 determines that the reception signal is of the "H" level in Step S50 (YES in Step S50), it can be determined that data of the "L" level has not been output from the other controllers 10 that are the other masters.

Next, the restoration circuit 14 clears the collision information (Step S52).

Then, the restoration circuit 14 executes the restoration operation (Step S54). Specifically, the transmission of data from the controller 10 is started again. It should be noted that in order to suppress a collision of data with the other controllers 10 at the time of the restoration operation, the restoration operation may be started after further waiting for a predetermined period.

Then, the process is completed (end).

On the other hand, in the case where the restoration circuit 14 determines that the reception signal is not of the "H" level in Step S50 (NO in Step S50), it can be determined that data of the "L" level has been output from the other controllers 10 that are the other masters. In this case, the restoration circuit 14 waits until the reception signal becomes the "H" level.

Then, the restoration circuit 14 waits until the reception signal becomes the "'H" level in Step S50. After the reception signal becomes the "H" level, the above-described restoration operation is executed.

Then, the process is completed (end).

On the other hand, in the case where the restoration circuit 14 determines that no collision has occurred in the destroy section in Step S62 (NO in Step S62), it is determined whether or not a collision has occurred (Step S64). In the case of FIGS. 13A, 13B, and 13C, the collision detection sections are the sections (0), (2), and (4), respectively, and thus are determined as not the destroy sections but the gray sections. Then, it is determined on the basis of the collision information whether or not the collision has occurred.

In the case where it is determined that the collision has occurred in Step S64 (YES in Step S64), the transmission is stopped (Step S65). The restoration circuit 14 stops the transmission of data to the bus BS1 through the DALI communication interface module 4.

Next, the restoration circuit 14 determines whether or not a reception signal from the bus BS1 through the DALI communication interface module 4 is of the "H" level (Step S68).

In the case where the restoration circuit 14 determines that the reception signal is of the "H" level in Step S68 (YES in Step S68), it can be determined that data of the "L" level has not been output from the other controllers 10 that are the other masters.

Next, the restoration circuit 14 clears the collision information (Step S70).

Then, the restoration circuit 14 executes the restoration operation (Step S74). Specifically, the transmission of data from the controller 10 is started again. It should be noted that in order to suppress a collision of data with the other controllers 10 at the time of the restoration operation, the restoration operation may be started after further waiting for a predetermined period.

On the other hand, in the case where the restoration circuit 14 determines that the reception signal is not of the "H" level in Step S68 (NO in Step S68), it can be determined that data of the "L" level has been output from the other controllers 10 that are the other masters. In this case, the restoration circuit 14 waits until the reception signal becomes the "H" level.

Then, the restoration circuit 14 waits until the reception signal becomes the "H" level in Step S68. After the reception signal becomes the "H" level, the above-described restoration operation is executed.

On the other hand, in the case where it is determined that no collision has occurred in Step S64 (NO in Step S64), the collision information is cleared (Step S76).

Then, the process is completed (end).

In the case of FIGS. 13A, and 13B, the collision detection sections are the sections (0) and (2), respectively, and it is determined on the basis of the collision information by the process that the collision has occurred. In this case, the transmission is stopped. Thereafter, in the case where it is determined that the reception signal is of the "H" level, the restoration operation is executed.

Further, in the case of FIG. 13C, it is determined that no collision has occurred. Thus, the transmission is not stopped.

Therefore, in the case where the collision interruption signal is input, it is properly determined on the basis of the collision information whether or not the collision has occurred, and a restoration operation with high accuracy is executed. On the other hand, in the case where the collision interruption signal is input and it is determined on the basis of the collision information that no collision has occurred, the transmission is not stopped. Thus, the data communications can be stably continued.

Further, in the case where the collision has occurred in the gray section, there is a possibility that the collision has temporarily occurred. Thus, the occurrence of the collision of the other controllers 10 that are the other masters on the bus BS1 is not detected by outputting data of the "L" level. Accordingly, the restoration operation in the entire system can be executed at high speed.

Another Embodiment

In the description of the above-described example, a photocoupler is used as a component of a communication interface module. However, the present invention is not particularly limited to the component, but can be similarly applied to a case in which, for example, iCoupler (registered trademark) is used instead of the photocoupler.

Apart of the above-described signal processing can be realized by an application program. Namely, an application that can be executed by the controller may be provided as a program in the embodiment. In this case, the program according to the embodiment may be incorporated as some functions (modules) of various applications executed on a computer.

The disclosure has been concretely described above on the basis of the embodiments. However, it is obvious that the disclosure is not limited to the embodiments, but can be variously changed without departing from the scope thereof.

What is claimed is:

1. A collision determination circuit, comprising:
   an edge detection circuit that detects change timing of a signal representing data of a command signal transmitted to a light source control device;
   an area setting circuit that sets a plurality of collision determination areas in accordance with the change timing detected by the edge detection circuit; and
   a collision detection circuit that detects the presence or absence of a collision of the data of the command signal with other data in the plurality of collision determination areas.

2. The collision determination circuit according to claim 1,
   wherein the area setting circuit includes a register for setting a parameter to set a range of each collision determination area.

3. The collision determination circuit according to claim 1,
   wherein the area setting circuit sets the collision determination areas and a data detection area where the data is normally detected.

4. The collision determination circuit according to claim 3,
   wherein the area setting circuit sets the collision determination areas, the data detection area, and a variable area that can be set to any one of the collision determination areas and the data detection area.

5. The collision determination circuit according to claim 1,
wherein the plurality of collision determination areas includes a first determination area and a second determination area, and
wherein a restoration circuit executes a first restoration operation in a case where the collision has occurred in the first determination area, and executes a second restoration operation in a case where the collision has occurred in the second determination area.

6. The collision determination circuit according to claim 1,
wherein the area setting circuit sets a first collision determination area in case that the change timing detected by the edge detection circuit corresponds to a bit boundary, and a second collision determination area in case that the change timing detected by the edge detection circuit corresponds to a middle of a bit.

7. The collision determination circuit according to claim 6,
wherein the area setting circuit is further configured to set a plurality of first collision determination areas and a plurality of second collision determination areas.

8. A light source control system, comprising:
a plurality of light sources; and
a plurality of corresponding light source control devices configured to communicate with each other through a bus,
wherein the light source control devices include a plurality of main light source control devices that transmit command signals to the other light source control devices,
wherein each of the main light source control devices includes a collision determination circuit that determines whether data of the command signal transmitted through the bus has collided with other data, and
wherein the collision determination circuit includes an edge detection circuit that detects change timing of a signal representing the data of the command signal;
an area setting circuit that sets a plurality of collision determination areas in accordance with the change timing detected by the edge detection circuit; and
a collision detection circuit that detects the presence or absence of a collision in the plurality of collision determination areas.

* * * * *